Oct. 28, 1969   H. R. NEWELL   3,475,667
PULSE PROGRAMMERS FOR STEP MOTORS INCLUDING REMOVAL AND
ADDITION OF PULSES OF THE TRAIN FEEDING SAID MOTOR
Filed Jan. 19, 1967   2 Sheets-Sheet 1
Fig.1
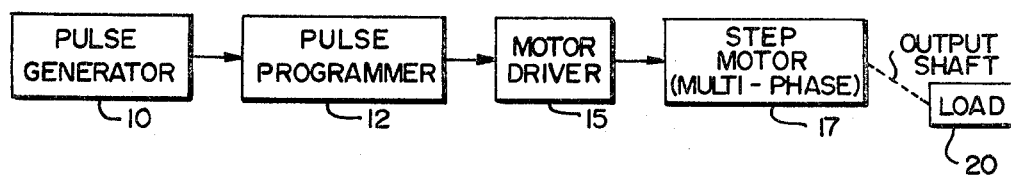
Fig.2a
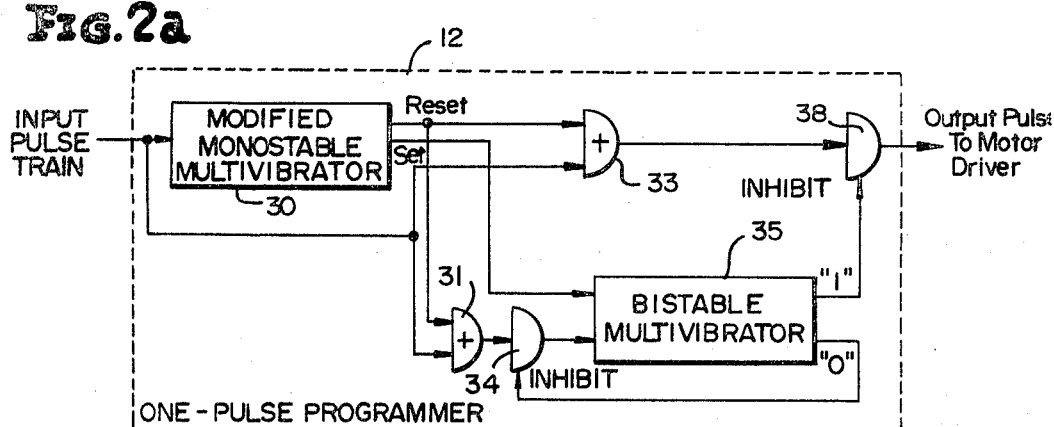
Fig.2b
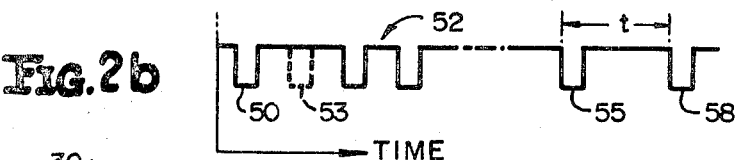
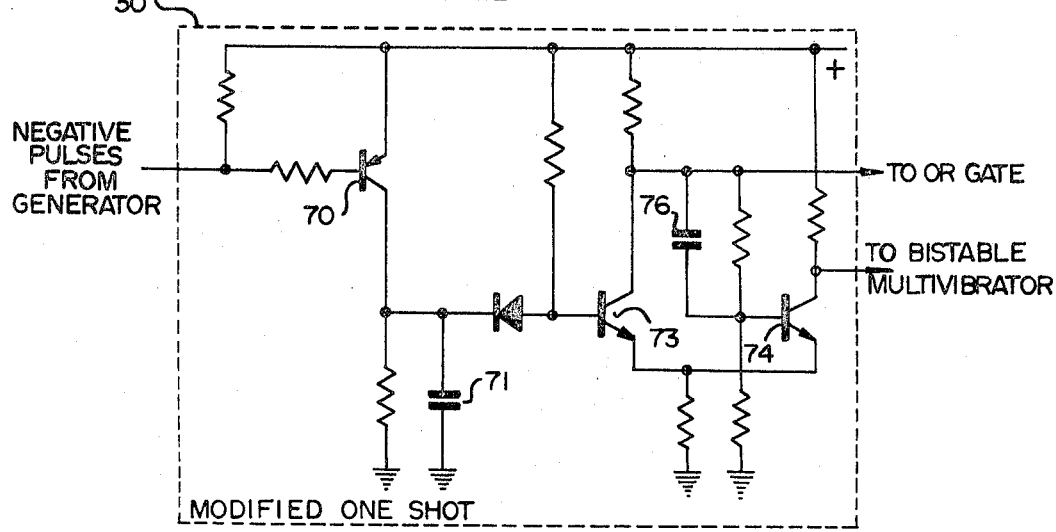
Fig.3
INVENTOR
HAROLD R. NEWELL
BY Hurwitz, Rose & Greene
ATTORNEYS

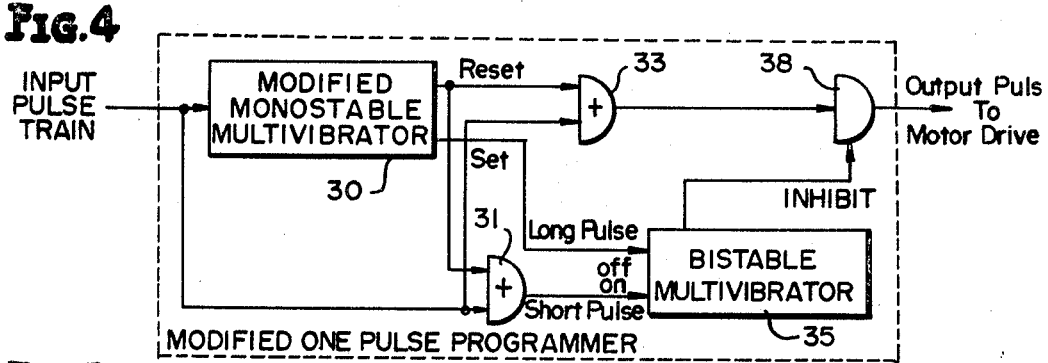
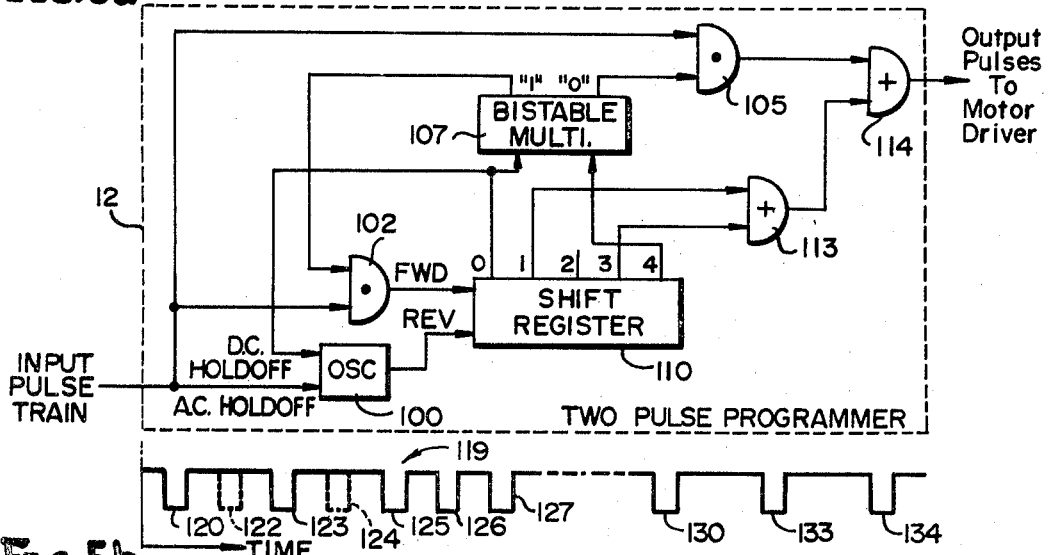
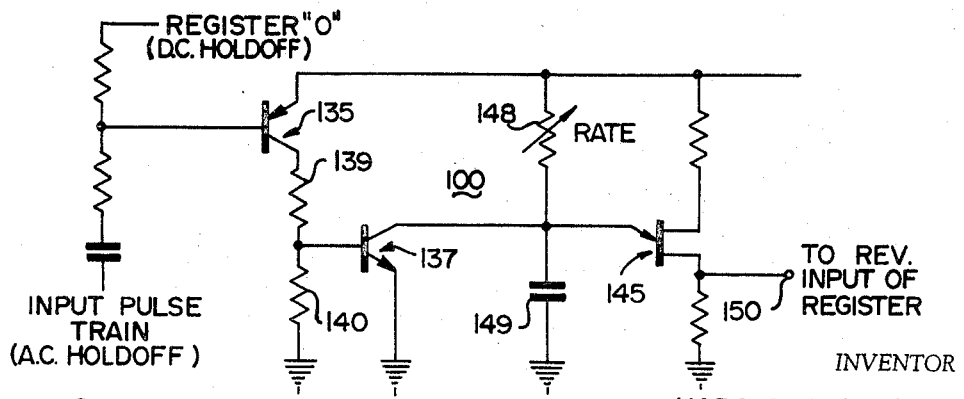

3,475,667
PULSE PROGRAMMERS FOR STEP MOTORS INCLUDING REMOVAL AND ADDITION OF PULSES OF THE TRAIN FEEDING SAID MOTOR
Harold R. Newell, South Newbury, N.H., assignor to Mesur-Matic Electronics Corporation, Warner, N.H., a corporation of Delaware
Filed Jan. 19, 1967, Ser. No. 610,426
Int. Cl. H02k 29/00; H02p 5/06
U.S. Cl. 318—138                                    8 Claims

ABSTRACT OF THE DISCLOSURE

Circuits for passing or blocking pulses in an incoming pulse train according to position of the pulses in the train, to vary the rate at which the pulses are supplied to the driving circuitry of a step motor.

Background of the invention

The present invention relates generally to stepping motors and in particular to control circuits for stepping motors, by which to selectively govern the rate at which the motor is stepped.

In the past, severe difficulties have been encountered in the operation of DC stepping motors under conditions of high inertial loading, primarily in respect to limitations on acceleration and deceleration of the motor. Unless acceleration and deceleration is limited the impact loading on the motor and power train may result in significant damage to those components of the system. Of equal importance is the loss of positioning accuracy and resolution when the motor is required to undergo practically instantaneous acceleration to or deceleration from a high stepping rate from or to a condition of rest, respectively.

Prior art methods of appropriate control have primarily constituted variation of the frequency of the pulse train employed to drive the motor, or variation of width of the pulses to consequently vary the duty cycle. While these methods have had limited success, they have generally been implemented in the form of complex and expensive circuitry requiring close surveillance and having inherent sensitivity to even slight changes in environmental conditions.

Summary of the invention

It is a principal object of the present invention to provide improved circuits for controlling the application of driving pulses to step motors.

Briefly, according to the present invention the control circuit includes some form of gate means for passing or blocking pulses in or derived from an incoming pulse train, and means for selectively operating said gate means to control the blocking or passing of pulses according to position of the pulses in the train, in such manner as to initially and finally reduce the pulse rate from the normal pulse rate of the train whereby to slowly accelerate and decelerate the step motor under conditions of higher than normal inertial loads.

According to one aspect of the invention, certain of the pulses which would normally be supplied to the driver circuitry for the step motor are eliminated, but no other change is made in the pulse train. In particular, at least one pulse immediately or shortly thereafter following the first pulse of the train is deleted. But unless all of the pulses are subseqeuntly supplied by the driver, the motor will not undergo the desired stepping.

According to a further aspect of the invention, the eliminated pulse or pulses are restored, i.e., regenerated, and applied to the driver circuitry following the last pulse of the train from which they had been deleted. The rate of regeneration is less than the normal pulse rate of the train to allow gradual deceleration of the motor.

Accordingly, it is another object of the present invention to provide a control circuit for programming the application of pulses to the driver circuit of a step motor, by eliminating certain of the pulses in the pulse train to the driver circuit and subsequently restoring the eliminated pulses for application to the driver circuit.

Brief description of the drawings

The above and still further objects, features and attendant advantages of the present invention will become apparent from a consideration of the following detailed description of certain preferred embodiments thereof, especially when taken in conjunction with the accompanying drawings, in which:

FIGURE 1 is a block diagram of a generalized control system for step motors;

FIGURE 2a is a circuit diagram of a "one pulse" version of the pulse programmer of the system of FIGURE 1;

FIGURE 2b is a waveform representing the pulse output of the circuit of FIGURE 2a;

FIGURE 3 is a circuit diagram of the modified monostable multivibrator in the programmer of FIGURE 2a;

FIGURE 4 is a modification of the "one pulse" programmer of FIGURE 2a;

FIGURE 5a is a circuit diagram of an embodiment of "two pulse" programmer for use in the circuit of FIGURE 1;

FIGURE 5b is a waveform representing the pulse output of the circuit of FIGURE 5a; and FIGURE 6 is a circuit diagram of an exemplary oscillator for the circuit of FIGURE 5a.

Description of the preferred embodiments

Refering now to FIGURE 1, the overall control system for the step motor includes a pulse oscillator or generator 10 which may be of any conventional type suitable for supplying a train of pulses to a pulse programmer 12 whose structure and operation will be described in detail by way of exemplary embodiments in the ensuing disclosure. Output pulses from pulse programmer 12 are applied to a motor driver 15, such as a conventional arrangement of switching circuits adapted for sequential activation according to a predetermined switching logic program to selectively excite the field windings (phases) of a multi-phase step motor 17.

The function of pulse programmer 12 is to modify the sequence or train of pulses arriving from generator 10 such that the pulses eventually supplied to the driver 15 are initially separated by a time interval or intervals sufficient to permit acceleration of the load 20 coupled to the step motor by its output shaft. This permits the step motor (and its control circuitry) to handle high inertial loads, or loads of greater inertia than that normally encountered, at a predetermined stepping rate.

In the following description two preferred types of pulse programmers will be discussed, one of which blocks the passage of the second pulse in the incoming pulse train while permitting unrestricted passage of the other pulses, and the other of which blocks the passage of the second and fourth pulses of the train. The first type is hereinafter referred to as a "one pulse programmer" and the second type as a "two pulse programmer." To the extent that both types effectively remove a pulse or pulses from their initial positions in the train and restore the removed or "missing" pulses following the last pulse of the input train, it may be said that each programmer merely "delays" certain of the pulses.

Referring to FIGURE 2a, an embodiment of a one pulse programmer suitable for use as unit 12 of FIGURE 1, includes a modified monostable or one-shot multivibrator 30 and OR gates 31 and 33 connected for parallel receipt of the input pulse train. The first pulse 50 (FIGURE 2b) of the negative pulse train 52 from generator 10 triggers or "sets" one-shot multivibrator 30 to the quasi-stable state from its initial stable state or condition. This in turn results in the application of a pulse from the one-shot to bistable multivibrator 35, switching the latter from its initial ("0") state in which it inhibits the passage of pulses through inhibit gate 34, to its "1" state in which it supplies an "inhibit" pulse to block the passage of pulses via inhibit gate 38. In the meantime, however, the first input pulse 50 has passed through OR gate 33 and inhibit gate 38, prior to the switching of flip-flop 35 to its "1" state.

The delay time or reset period of modified monostable multivibrator 30 is updated, i.e., restarted, with each incoming pulse, to insure that the one-shot will not reset between the end of one incoming pulse and the beginning of the next. To this end multivibrator 30 may be implemented as shown in FIGURE 3, such that each negative pulse turns on transistor 70 to charge capacitor 71, thus re-establishing the beginning of the delay period. Transistors 73 and 74 together with their associated circuit elements form a conventional emitter-coupled monostable multivibrator in which the stable state is characterized by transistor 74 being "on" and transistor 73 "off." Once triggered to its set or quasi-stable state, in which transistor 73 is "on" and transistor 74 is "off," the one-shot will spontaneously return to its stable state, i.e., will "reset," after the delay or reset period determined by the circuit parameters, particularly the time constant of capacitor 76 and associated resistive components. In essence, the delay period is that amount of time required for the bias voltage at the base of transistor 74 to "rise" to a value exceeding the cutoff voltage bias. The delay or reset time of the one-shot multivibrator is adjusted to exceed the known input pulse period. Accordingly, the incoming negative pulses of train 52 repetitively render transistor 70 conductive and charge capacitor 71 before the one-shot can return to its stable state, and thus "update" or restart the delay period.

Upon assumption of the "set" (quasi-stable) state, a pulse is generated at the collector of transistor 74 and applied to an input terminal of flip-flop 35 to switch the latter from its "0" to its "1" state, in which it supplies an "inhibit" pulse to gate 38. The second pulse in the input train (designated in dotted form as pulse 53 of the output pulse waveform for programmer 12 in FIGURE 2b) updates the delay period of multivibrator 30 and passes through OR gates 31 and 33. It is blocked, however, at gate 38 which is now in its "inhibit" condition. Hence, the second pulse of the input pulse train does not appear in the pulse train to the motor driver at the output of the pulse programmer (FIGURE 2a). This second pulse does, however, pass through gate 34 which is presently in an "uninhibited" state, and switches flip-flop 35 back to the "0" state.

Subsequent incoming pulses restart the delay time of one-shot 30 (with the result, of course, that no further pulses are generated by the one-shot) and pass through each of OR gates 31 and 33, but are blocked by inhibited gate 34 whereas they pass freely through uninhibited gate 38. After the last input pulse 55 has passed through one-pulse programmer 12, the monostable multivibrator is no longer prevented from resetting itself to the stable state and does so after the delay time τ. Accordingly, another pulse is generated by monostable multivibrator 30, this time at the collector of transistor 73, and is passed via gates 33 and 38 to the driver. This pulse, designated by reference numeral 58 in the output pulse train 52 of FIGURE 2b, provides further advantage in the inertial handling capability of the motor and drive system in that the time τ (FIGURE 2b) between the last incoming pulse and generation of pulse 58 is longer than that between successive pulses in the input train, allowing smooth deceleration of the motor and load.

Similarly, abrupt acceleration of high inertial loads with resultant damage to the overall power train is prevented by the longer than normal time between the first and second pulses supplied to driver 15 by one pulse programmer 12.

It will be noted that pulse 58, generated as a result of reset of the one-shot multivibrator, is also supplied to OR gate 31 and through gate 34 to switch flip-flop 35 to its "0" state. This is necessary in the event of an input pulse train of only one pulse, to insure proper initial conditions for the next incoming pulse train.

Modifications of the one pulse programmer are entirely possible within the scope of the present invention. For example, a somewhat simplified programmer is shown in FIGURE 4. The modified monostable multivibrator 30 of FIGURE 3 may again be employed, along with OR gates 31 and 33, bistable multivibrator 35 and inhibit gate 38. The first input pulse sets one-shot 30 and also passes through gates 33 and 38 just before the "set" output pulse of the one-shot switches flip-flop 35 to the "off" state such that gate 38 is rendered non-conductive (inhibited). The first input pulse is also passed by gate 31 for application to the "on" input of flip-flop 35, but if the "set" pulse from one-shot multivibrator 30 is slightly longer than any pulse in the input train it will override or outlast the first input pulse and thus maintain flip-flop 35 in the "off" condition in which an inhibit pulse is supplied to gate 38. Hence, the second incoming pulse is prevented from passing through inhibited gate 38, as in the embodiment of FIGURE 2, and does not "step" the driver and motor.

The second pulse is, however, applied to the "on" input of flip-flop 35 and the change of state of the latter returns gate 38 to a conducting condition. Therefore, the third and all subsequent input pulses are supplied via the one pulse programmer to the driver and motor. As before, the length of time between the first and second pulses applied to the driver insures slow acceleration of high inertial loads. Again, the input pulse rate is sufficiently high that modified one-shot multivibrator 30 cannot reset until after the last input pulse, when the "removed" pulse is "restored" and fed to the driver.

Referring now to FIGURE 5a, an embodiment of a two pulse programmer for use as unit 12 in FIGURE 1 includes a pulse oscillator 100 to which the input pulses are supplied, a pair of AND gates 102 and 105 also connected to receive the incoming pulse train, a bistable multivibrator 107 which, depending upon its state, supplies one or the other of the AND gates, a forward-backward shift register (or counter) 110 for supplying DC voltages (pulses) to selected ones of the other components of the programmer, depending upon which of the register stages is energized, and a pair of OR gates 113 and 114.

In the circuit of FIGURE 5a, the shift register is normally in the "0" condition and flip-flop 107 in the "1" state. Accordingly, AND gate 102 is "on" (i.e., ready to pass pulses), AND gate 105 is "off," and oscillator 100 is held "off" by the DC voltage from the "0" stage of the shift register.

An exemplary embodiment of pulse generator or oscillator 100 is shown in FIGURE 6. The circuit includes a PNP transistor 135 to the base of which the input pulse train and/or negative DC voltage from the "0" stage of the shift register are applied, an NPN transistor 137 having its base connected to the junction of a pair of resistors 139, 140 in the collector path of transistor 135, a unijunction transistor having its emitter connected to the collector of transistor 137, and an RC network comprising variable resistor 148 and capacitor 149 for determining the pulse rate or conduction frequency of the unijunction transistor. The pulse output to the reverse input of shift register 110 is taken from terminal 150 of the oscillator.

In operation of the oscillator, negative voltage at the base of transistor 135 renders the latter conductive thus supplying positive voltage to and turning "on" transistor 137. Accordingly, the potential at the emitter of unijunction transistor 145 is insufficient to permit that transistor to conduct. Since the negative input to transistor 135 is supplied by either the input pulse train or the output of the "0" stage of the shift register, the input train pulses must be sufficiently closely spaced to insure that the oscillator is held "off." When the input voltage to transistor 135 is removed for a sufficient period of time the unijunction transistor 145 alternately turns on and off at a rate which may be adjusted according to the setting of resistance 148.

Returning now to FIGURES 5a and 5b, the latter showing the output pulses from the programmer circuit of the former, the first pulse 120 of the input train passes through AND gate 102 (since the AND gate is supplied with a second input from flip-flop 107, as previously mentioned) and to the "forward" input of register 110. The register is thus shifted to "1" and an output pulse is supplied from that stage, through OR gates 113 and 114, to the motor driver. Oscillator 100 continues to be cut off or held off by the incoming pulse train, despite the forward shift to stage "1" of register 110 and the consequent removal of the DC holdoff from the oscillator.

The first input pulse 120 is also applied to AND gate 105 but cannot pass therethrough because of the absence of a concurrent pulse at the second input of that gate (since flip-flop 107 is in the "1" state).

The second input pulse 122 is also passed by AND gate 102 to the "FWD" input of register 110. Accordingly, the register shifts to stage "2" which has no component connection to its output terminal, resulting in the absence of pulse 122 (shown dotted in FIGURE 5b) from pulse train 119 supplied to the motor driver.

The third input pulse shifts register 110 to stage "3," whereupon a pulse is generated from that stage through gates 113 and 114 to the motor driver, as designated by reference numeral 123 in FIGURE 5b.

Continuing, the fourth input pulse 124 shifts the register to "4" which changes the state of flip-flop 107 but does not result in an output pulse to the motor driver. With the flip-flop in its "0" state, AND gate 105 is rendered conductive and AND gate 102 non-conductive so that the fifth pulse and all subsequent pulses pass directly to the motor driver via gates 105 and 114. Following the termination of the last pulse (130) of the input train, oscillator 100 is permitted to supply pulses to the reverse input of register 110, thereby shifting the register backward toward stage "0." Shifts to stages "3" and "1" result in application of pulses to gates 113, 114 and on to the driver. The latter pulses are designated 133, 134 in FIGURE 5b and constitute, in effect, a regeneration of the two pulses erased from the input pulse train.

When the register is shifted back to "0" flop-flop 107 is switched to the "1" state, turning off gate 105 and turning on gate 102, and DC "holdoff" voltage is again applied to oscillator 100, in readiness for the next input pulse train.

Use of the two pulse programmer in place of a one pulse programmer results in even slower acceleration and deceleration of the motor, for better handling of still larger inertial loads.

I claim:
1. Apparatus for programming the supply of driving pulses to a step motor responsive to said driving pulses for stepping a load to a desired position,
   means for generating a train of pulses at a constant repetition frequency, the number of pulses in said train being preselected to produce stepping of said load by said motor to said desired position,
   means responsive to pulses applied thereto for supplying said driving pulses to said step motor, and
   means responsive to said train of pulses for selectively removing from the train at least one pulse following the first pulse in the beginning portion of the train while applying all of the remaining pulses in said train to said driving pulse supplying means in substantially unaltered form and spacing, and for adding at the conclusion of said train a number of pulses equal to the number of pulses selectively removed from the beginning portion of said train for application to said driving pulse supplying means at a frequency less than said constant repetition frequency, to initially and finally reduce the frequency of pulses supplied to said driving pulse supplying means and thereby to produce gradual acceleration and deceleration of said motor.

2. The combination according to claim 1 wherein said pulse removing means removes only the second pulse in each train.

3. The combination according to claim 1 wherein said pulse removing means removes the second and fourth pulses in each train.

4. The combination according to claim 1 wherein said pulse removing and adding means includes means for storing pulses representative of the pulses removed from said train and for reproducing the stored pulses as the added pulses at the conclusion of said train.

5. The combination according to claim 2 wherein said pulse removing and adding means includes
   a monostable multivibrator having a normal fixed delay time interval over which it remains in its quasi-stable state, when triggered thereto from its normal stable state, and including means responsive to pulses occurring at said constant repetition frequency for restarting said delay time interval with each succeeding pulse, before the expiration of said delay time interval following the preceding pulse,
   means for applying said train of pulses to said monostable multivibrator via said restarting means, to trigger said multivibrator to its quasi-stable state with the first pulse in said train and to retain said multivibrator in its quasi-stable state as long as pulses are applied thereto at said constant repetition frequency, said multivibrator responsive to assumption of said quasi-stable state to generate a first pulse and response to spontaneous return to said stable state to generate a second pulse,
   gate means normally further responsive to said train of pulses for passage thereof to said driving pulse supplying means,
   means responsive to said first pulse generated by said multivibrator for inhibiting said gate means from passing pulses only during the interval in which said second pulse of said train is applied to said gate means, and
   means for applying the second pulse generated by said multivibrator, upon spontaneous return to its stable state at the conclusion of said pulse train, to said gate means for passage to said driving pulse supplying means.

6. The combination according to claim 1 wherein said pulse removing and adding means includes
   a normally disabled pulse oscillator,
   a binary shift register having forward and reverse input terminals and having a plurality of cascaded stages containing a single bit which may be shifted sequentially through said cascaded stages to cause the production of a pulse from each stage to which said bit is shifted,
   gate means responsive, when enabled, to said train of pulses for passage thereof to said driving pulse supplying means,
   means for applying said train of pulses concurrently to said pulse oscillator, to said gate means, and to said forward input terminal of said shift register, said gate means being normally disabled, and said first stage of said register initially containing said bit,
   further gate means coupled to the first-named gate means and to said shift register for passing pulses issuing from either one thereof, means connecting preselected stages of said shift register other than the first and last stages to said further gate means for response to pulses produced by said preselected stages as said single bit is shifted therethrough, means coupling the last stage of said shift register to said first-named gate means for enabling said first-named gate means in response to a pulse produced by said last stage, means coupling the output of said pulse oscillator to said reverse input terminal of said shift register, said pulse oscillators responsive to the absence of said pulse train for supplying reverse shift pulses to said register, whereby pulses are removed from said train in accordance with an absence of connections between stages of said shift register and said further gate means, and pulses are added at the conclusion of said pulse train in response to reverse shifting of said bit through said preselected stages.

7. Apparatus for controlling the acceleration and deceleration of a stepping motor by programming the introduction of pulses from a pulse train containing a fixed number of pulses occurring at a uniform rate to the driver circuit of said motor, said apparatus comprising means responsive to said pulse train for selectively removing from said pulse train at least one pulse immediately following the first pulse in said train without otherwise altering the character of said train in its path to said driver circuit to gradually accelerate said motor, means for registering the number of pulses selectively removed from said pulse train by said means for removing, and means coupled to said registering means for sensing the number of pulses registered and for reinserting the same number of pulses in said path at the conclusion of said pulse train.

8. The invention according to claim 7 wherein the last-named means reinserts said pulses at a rate less than said uniform rate to gradually decelerate said motor.

References Cited

UNITED STATES PATENTS

| 3,328,658 | 6/1967 | Thompson | 318—138 |
| 3,374,410 | 3/1968 | Cronquist et al. | 318—138 XR |

ORIS L. RADER, Primary Examiner

G. R. SIMMONS, Assistant Examiner

U.S. Cl. X.R.

313—254